US010789222B2

(12) United States Patent
Lu et al.

(10) Patent No.: US 10,789,222 B2
(45) Date of Patent: Sep. 29, 2020

(54) BLOCKCHAIN-BASED HIERARCHICAL DATA STORAGE

(71) Applicant: Alibaba Group Holding Limited, George Town (KY)

(72) Inventors: Zhonghao Lu, Hangzhou (CN); Benquan Yu, Hangzhou (CN); Haizhen Zhuo, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/790,596

(22) Filed: Feb. 13, 2020

(65) Prior Publication Data
US 2020/0183898 A1 Jun. 11, 2020

Related U.S. Application Data

(63) Continuation of application No. PCT/CN2020/072030, filed on Jan. 14, 2020.

(30) Foreign Application Priority Data

Jun. 28, 2019 (CN) .......................... 2019 1 0576961

(51) Int. Cl.
*G06F 16/21* (2019.01)
*G06F 16/22* (2019.01)
(Continued)

(52) U.S. Cl.
CPC ........ *G06F 16/214* (2019.01); *G06F 11/3034* (2013.01); *G06F 16/137* (2019.01);
(Continued)

(58) Field of Classification Search
USPC ....................................................... 707/609
See application file for complete search history.

(56) References Cited

U.S. PATENT DOCUMENTS 5,727,150 A    3/1998   Laudon et al.
7,647,329 B1   1/2010   Fischman et al.
(Continued)

FOREIGN PATENT DOCUMENTS

CN    108197226    6/2018
CN    108282474    7/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Muluemebet Gurmu
(74) *Attorney, Agent, or Firm* — Fish & Richardson P.C.

(57) ABSTRACT

Disclosed herein are methods, systems, and apparatus, including computer programs encoded on computer storage media, for blockchain-based hierarchical data storage. One of the methods includes: determining, based on a blockchain stored in a database that includes multiple levels of storage, a block number interval that includes one or more block numbers associated with data nodes to be migrated to a lower level of storage in response to the data nodes meeting a data migration condition, wherein each of the data nodes is included in a state Merkle tree and is associated with a block number of a block of the blockchain where the corresponding data node was last updated, and the lower level of storage corresponds to a storage media with lower storage cost.

18 Claims, 7 Drawing Sheets

(51) Int. Cl.
*H04L 9/06* (2006.01)
*G06F 16/182* (2019.01)
*G06F 11/30* (2006.01)
*G06F 16/13* (2019.01)

(52) U.S. Cl.
CPC ...... *G06F 16/1824* (2019.01); *G06F 16/2246* (2019.01); *H04L 9/0637* (2013.01)

(56) References Cited

U.S. PATENT DOCUMENTS

| | | | |
|---|---|---|---|
| 10,242,065 B1 | 3/2019 | Starling et al. | |
| 2004/0245547 A1* | 12/2004 | Stipe | G11C 11/22 257/200 |
| 2008/0195583 A1 | 8/2008 | Hsu et al. | |
| 2009/0228655 A1 | 9/2009 | Yamane | |
| 2014/0188957 A1 | 7/2014 | Hosoi | |
| 2016/0275201 A1* | 9/2016 | Li | G06F 17/30 |
| 2017/0255950 A1* | 9/2017 | Krug | G06N 7/005 |
| 2017/0264684 A1 | 9/2017 | Spillane et al. | |
| 2018/0060596 A1 | 3/2018 | Hamel et al. | |
| 2018/0205552 A1* | 7/2018 | Struttmann | G06F 16/9024 |
| 2018/0294977 A1 | 10/2018 | Uhr et al. | |
| 2019/0139043 A1 | 5/2019 | Davis | |
| 2019/0295079 A1 | 9/2019 | Bae | |
| 2019/0349733 A1* | 11/2019 | Nolan et al. | H04L 12/733 |
| 2020/0012527 A1 | 1/2020 | Hartsock | |
| 2020/0026548 A1 | 1/2020 | Huang | |

FOREIGN PATENT DOCUMENTS

| | | |
|---|---|---|
| CN | 108829350 | 11/2018 |
| CN | 109144414 | 1/2019 |
| CN | 109165224 | 1/2019 |
| CN | 109359222 | 2/2019 |
| CN | 109559234 | 4/2019 |
| CN | 109669709 | 4/2019 |
| CN | 109684333 | 4/2019 |
| CN | 109726229 | 5/2019 |
| CN | 109756573 | 5/2019 |
| CN | 109903049 | 6/2019 |
| CN | 109919756 | 6/2019 |
| CN | 110334154 | 10/2019 |
| CN | 110347660 | 10/2019 |
| WO | WO 2019101229 | 5/2019 |

OTHER PUBLICATIONS

Nakamoto, "Bitcoin: A Peer-to-Peer Electronic Cash System," www.bitcoin.org, 2005, 9 pages.

Ghoshal et al., "Exploiting Block-Chain Data Structure for Auditorless Auditing on Cloud Data", International Confernece on Information Systems Security, Nov. 2016, 13 pages.

Liu et al., "A Data Storage Method Based on Blockchain for Decentralization DNS", 2018 IEEE Third International Conference on Data Science in Cyberspace, Jul. 2018, 8 pages.

PCT International Search Report and Written Opinion in International Application No. PCT/CN2020/072026, dated Apr. 13, 2020, 17 pages (with machine translation).

PCT International Search Report and Written Opinion in International Application No. PCT/CN2020/072030, dated Apr. 13, 2020, 17 pages (with machine translation).

Shao et al., "Blockchain: Architecture and Research Progress", Chinese Journal of Computers, May 2018, 20 pages (with English abstract).

* cited by examiner

BLOCKCHAIN-BASED HIERARCHICAL DATA STORAGE

CROSS-REFERENCE TO RELATED APPLICATIONS

This application is a continuation of PCT Application No. PCT/CN2020/072030, filed on Jan. 14, 2020, which claims priority to Chinese Patent Application No. 201910576961.X, filed on Jun. 28, 2019, and each application is hereby incorporated by reference in its entirety.

TECHNICAL FIELD

One or more embodiments of the present specification relate to the technical field of blockchain, in particular, to a blockchain-based hierarchical storage method and an apparatus, and an electronic device.

BACKGROUND

Blockchain technology, also known as distributed ledger technology, is an emerging technology in which several computing devices participate in "accounting" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present specification provides a blockchain-based hierarchical storage method, where account state data of the blockchain is organized into a state Merkle tree and stored in a database; the database includes multi-level data storage; each of the data nodes on the state Merkle tree is labeled with a block number, indicating a block where the data node was located when the data node had data update; and the method includes: when target data storage of any level in the database satisfies a data migration condition, determining a block number interval corresponding to data nodes in the target data storage that need to be migrated to the lower level data storage; determining a migration threshold based on the block number interval, where the migration threshold is a block number threshold larger than the block number interval; traversing the state Merkle tree of a target block corresponding to the migration threshold, to search for target data nodes labeled with block numbers respectively smaller than the migration threshold, and modifying the block numbers of the target data nodes searched out respectively to the migration threshold; and traversing the state Merkle tree of the block corresponding to each block number in the block number interval, to search for data nodes labeled with block numbers respectively smaller than the migration threshold, and migrating the data nodes searched out from the target data storage to the lower level data storage of the target data storage.

Optionally, determining a migration threshold based on the block number interval includes: when the block number interval is a right-opened interval, determining the right endpoint value of the block number interval as the migration threshold; and when the block number interval is a right-closed interval, determining the sum of the right endpoint value of the block number interval and a step size of the increase of the block number of the blockchain as the migration threshold.

Optionally, the database is a Key-Value database; and the data nodes on the state Merkle tree are stored in the database in the form of Key-Value pairs; wherein the key of the Key-Value pair is a hash value of the data content contained in the data node; the value of the Key-Value pair is the data content contained in the data node.

Optionally, the method further includes: determining data nodes having data update on the state Merkle tree of the latest block; and labeling the data nodes having data updates on the state Merkle tree of the latest block respectively with the block number of the latest block.

Optionally, the Value of the data node on the state Merkle tree stored in the database includes a reserved block number field; and the block number labeled for the data node on the state Merkle tree is added in the block number field.

Optionally, a block number field pointing to a storage location of the value of the data node on the state Merkle tree is reserved in the database; and the block number labeled for the data node on the state Merkle tree is added in the block number field.

Optionally, the Merkle tree is a variant of a Merkle tree incorporating a Trie dictionary tree structure.

Optionally, the state Merkle tree is a Merkle Patricia Tree state tree.

Optionally, the database is a LevelDB database; or a database based on the LevelDB architecture.

Optionally, the database is a Rocksdb database based on a LevelDB architecture.

Optionally, the read-write performance of the storage medium corresponding to the multi-level data storage has a difference in performance; and the read-write performance of the storage medium corresponding to the high-level data storage is higher than the read-write performance of the storage medium corresponding to the low-level data storage.

The present specification also provides a blockchain based hierarchical storage apparatus, wherein account state data of the blockchain is organized into a state Merkle tree and stored in a database; the database includes multi-level data storage; each of the data nodes on the state Merkle tree is labeled with a block number indicating a block where the data node was located when the data node had data update; and the apparatus includes: a determining module, configured to: when target data storage of any level in the database satisfies a data migration condition, determine a block number interval corresponding to data nodes in the target data storage that need to be migrated to the lower level data storage; determine a migration threshold based on the block number interval, wherein the migration threshold is a block number threshold larger than the block number interval; a modifying module, configured to traverse the state Merkle tree of a target block corresponding to the migration threshold, to search for target data nodes labeled with block numbers respectively smaller than the migration threshold, and modify the block numbers of the target data nodes searched out respectively to the migration threshold; and a migrating module, configured to traverse the state Merkle tree of the block corresponding to each block number in the block number interval, to search for data nodes labeled with block numbers respectively smaller than the migration threshold, and migrate the data nodes searched out from the target data storage to the lower level data storage of the target data storage.

Optionally, the determining module is configured to: when the block number interval is a right-opened interval, determine the right endpoint value of the block number interval as the migration threshold; and when the block number interval is a right-closed interval, determine the sum of the right endpoint value of the block number interval and a step size of the increase of the block number of the blockchain as the migration threshold.

Optionally, the database is a Key-Value database; and the data nodes on the state Merkle tree are stored in the database in the form of Key-Value pairs; wherein the key of the Key-Value pair is a hash value of the data content contained in the data node; the value of the Key-Value pair is the data content contained in the data node.

Optionally, the apparatus further includes: a labeling module, configured to determine data nodes having data update on the state Merkle tree of the latest block; and label the data nodes having data updates on the state Merkle tree of the latest block respectively with the block number of the latest block.

Optionally, the value of the data node on the state Merkle tree stored in the database includes a reserved block number field; and the block number labeled for the data node on the state Merkle tree is added in the block number field.

Optionally, a block number field pointing to a storage location of the Value of the data node on the state Merkle tree is reserved in the database; and the block number labeled for the data node on the state Merkle tree is added in the block number field.

Optionally, the Merkle tree is a variant of a Merkle tree incorporating a Trie dictionary tree structure.

Optionally, the state Merkle tree is a Merkle Patricia Tree state tree.

Optionally, the database is a LevelDB database; or a database based on the LevelDB architecture.

Optionally, the database is a Rocksdb database based on a LevelDB architecture.

Optionally, the read-write performance of the storage medium corresponding to the multi-level data storage has a difference in performance; and the read-write performance of the storage medium corresponding to the high-level data storage is higher than the read-write performance of the storage medium corresponding to the low-level data storage. In the above technical solutions, pruning of data nodes on the state Merkle tree stored in the database can be achieved. Data nodes that record historical state data are removed from the state Merkle tree, and migrated to the lower level of data storage. Data nodes that record the latest state data are remained and stored in the current-level of data storage. As such, hierarchical storage of the state Merkle tree stored in the database can be achieved.

DESCRIPTION OF EMBODIMENTS

Figure 1:
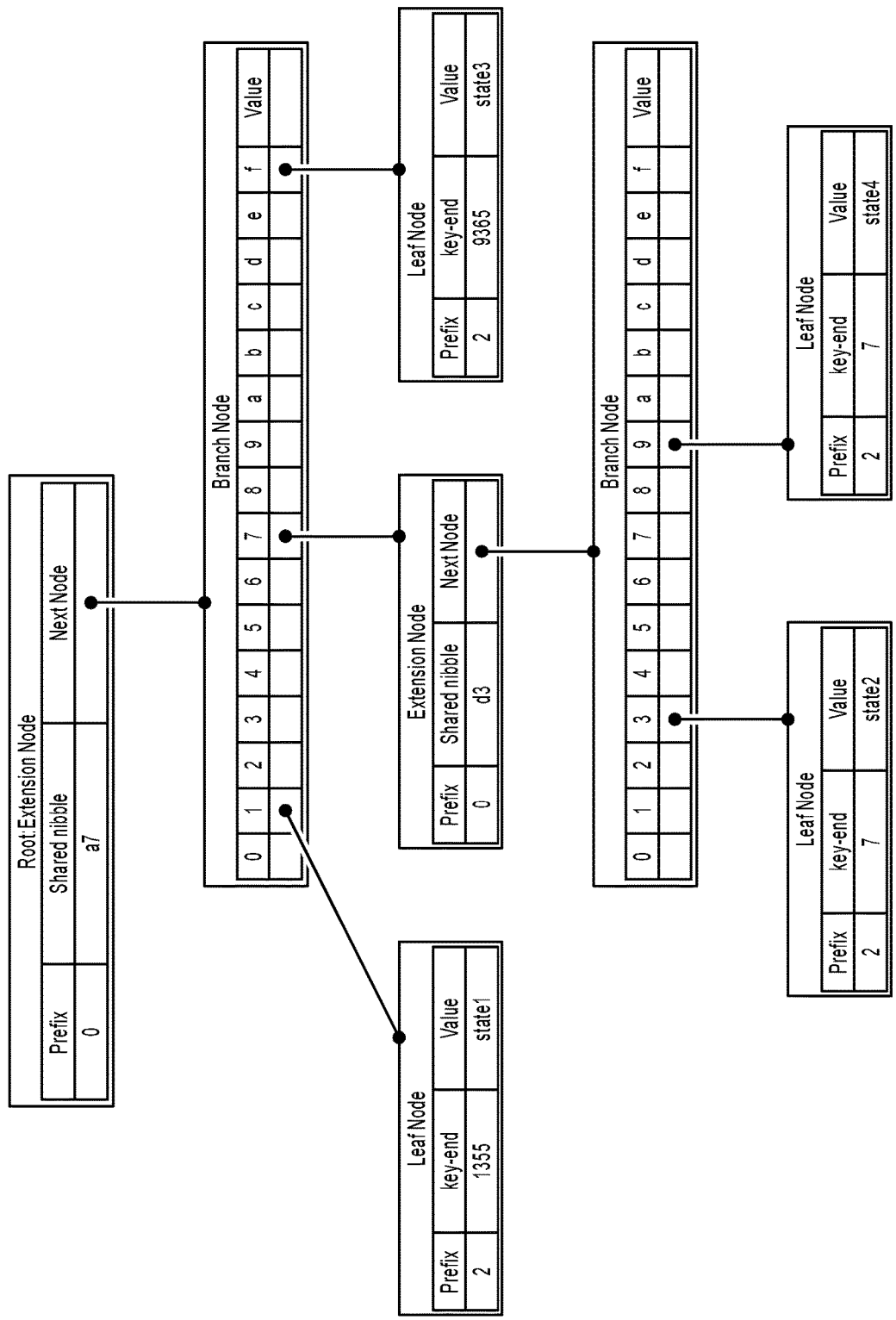
FIG. 1 is a schematic diagram illustrating organizing account state data of a blockchain into an MPT state tree, according to an example embodiment.

Example embodiments are described in detail here, and examples of the embodiments are presented in the accompanying drawings. When the following description relates to the accompanying drawings, unless specified otherwise, the same numerals in different drawings represent the same or similar elements. The embodiments described in the following example embodiments do not represent all embodiments consistent with one or more embodiments of the present specification. Rather, they are merely examples of apparatuses and methods consistent are described in the appended claims in detail and consistent with some aspects of the one or more embodiments of the present specification.

It should be noted that, in other embodiments, the steps of the corresponding method are not necessarily performed in a sequence shown and described in the present specification. In some other embodiments, the method can include more or fewer steps than those described in the present specification. In addition, a single step described in the present specification can be divided into multiple steps in other embodiments for description; and multiple steps described in the present specification can be combined into a single step for description in other embodiments.

Blockchains are generally classified into three types: public blockchains, private blockchains, and consortium blockchains. In addition, there can be combinations of the above types, such as private blockchain+consortium blockchain, consortium blockchain+public blockchain, etc. The most decentralized blockchain is the public blockchain. The public blockchain is represented by Bitcoin and Ethereum. Participants joining the public blockchain can read data records on the chain, participate in transactions, and compete for the accounting right for latest blocks.

Moreover, each participant (i.e. each node) can freely join and leave the network and perform related operations. On the contrary, for the private blockchain, the write permission of the network is controlled by an organization or institution, and the data read permission is regulated by the organization. In simple terms, a private blockchain can be a weakly centralized system, with strict restrictions on participating nodes and having a small number of nodes. This type of blockchain is more suitable for internal use by specific institutions.

Based on the basic characteristics of a blockchain, a blockchain is usually composed of several blocks. In each of these blocks, a timestamp corresponding to the creation time of the block is recorded, and all of the blocks form a time-ordered data chain strictly based on the timestamps recorded in the blocks.

The real data generated by the physical world can be constructed into a standard transaction format supported by the blockchain, and then posted to the blockchain, and the node devices in the blockchain will perform consensus processing on it. After reaching a consensus, the transaction will be packaged into a block by the node device that acts as an accounting node in the blockchain, and are stored persistently as a credential in the blockchain.

In the field of blockchain, there is an important concept: account. Taking Ethereum as an example, accounts are classified into two types: external accounts and contract accounts. An external account is an account directly controlled by a user; and a contract account is an account containing contract codes (that is, smart contracts), which is created by a user through an external account.

Certainly, for some blockchain projects (such as the ant blockchain) derived from the Ethereum-based architecture, the account types supported by the blockchain can be further expanded, which is not specifically limited in this description.

For an account in the blockchain, a structure is usually used to maintain the account state of the account. When a transaction in a block is executed, the state of the account associated with the transaction in the blockchain usually also changes.

Taking Ethereum as an example, the structure of an account usually includes fields such as Balance, Nonce, Code, and Storage.

The Balance field is configured to maintain a current account balance of the account.

The Nonce field is configured to maintain a quantity of transactions for this account; and it is a counter used to ensure that each transaction can be processed only once, to effectively avoid replay attacks.

The Code field is configured to maintain the contract codes of the account. In actual application, the Code field usually only maintains the hash value of the contract codes; therefore, the Code field is also commonly called the Codehash field. For external accounts, this field is null.

The Storage field is configured to maintain the storage content of the account (the field value is null by default). In practice, the Storage field usually only maintains the root node of the MPT (Merkle Patricia Trie) tree built based on the storage content of the account; therefore, the Storage field is also commonly called the StorageRoot field.

For an external account, the field values of the Code field and the Storage field are both nulls.

For most blockchain projects, Merkle trees are usually used; or, data structures based on Merkle trees are used to store and maintain data. Take Ethereum as an example. Ethereum uses the MPT tree (a variant of Merkle tree) as a data organization form to organize and manage important data such as account states and transaction information.

For data that needs to be stored and maintained in the blockchain, Ethereum designed three MPT trees, which are MPT state tree, MPT transaction tree, and MPT receipt tree.

The MPT state tree is an MPT tree formed by the account state data (state) of all accounts in the blockchain. The MPT transaction tree is an MPT tree formed by transaction data (transaction) in the block. The MPT receipt tree is an MPT tree formed by transaction receipts respectively corresponding to the transactions in the block generated after the execution of the transaction in the block is completed. The previously described hash values of the root nodes of the MPT state tree, the MPT transaction tree, and the MPT receipt tree will be added to the block header eventually.

Here, the MPT transaction tree and the MPT receipt tree correspond to a block, that is, each block has its own MPT transaction tree and MPT receipt tree. The MPT state tree is a global MPT tree, which does not correspond to a specific block, but covers the account state data of all accounts in the blockchain.

The organized MPT transaction tree, MPT receipt tree, and MPT state tree are eventually stored in a Key-Value database (such as LevelDB) that adopting a multi-level data storage structure.

The previously described database that adopts a multi-level storage structure can be divided into n-level data storages. For example, the data storage at each level can be set to a sequence of L0, L1, L2, L3, L (n−1); for each level of data storage in the database, the smaller the level number is, the higher the level is. For example, L0 stores the latest data of several blocks, and L1 stores the second latest data of several blocks, and so on.

Here, the reading and writing performance of the storage medium corresponding to the data storage at each level can also have performance differences. The reading and writing performance of the storage medium corresponding to a high-level (that is, with a small level number) data storage can be higher than the reading and writing performance of the storage medium corresponding to a low-level (that is, with a large level number) data storage.

For example, in actual Applications, high-level data storage can use storage medium with higher writing and reading performance; while lower-level data storage can use storage medium with lower unit cost and larger capacity. In actual application, as the block height of the blockchain increases, the data stored in the database will contain a lot of historical data. Moreover, the smaller the block number is, the older the data in the block is and the less important the data is. Therefore, in order to reduce the overall storage cost, data of different block heights usually need to be treated differently.

For example, data in blocks with smaller block numbers can be stored on lower-cost storage media; data in blocks with larger block numbers can be stored on higher-cost storage media.

When data such as the MPT transaction tree, the MPT receipt tree, and the MPT state tree stored in the database is hierarchically stored, the MPT transaction tree and the MPT receipt tree correspond to each block, which is actually "unrelated between blocks" data; therefore, for the MPT transaction tree and the MPT receipt tree, it is easy to perform hierarchical storage; for example, the data can be migrated directly based on the block number of the node on the MPT transaction tree and the MPT receipt tree to complete the hierarchical storage.

Based on this, the present specification will not specifically explain the hierarchical storage of the MPT transaction tree and the MPT receipt tree, but focus on the hierarchical storage of the MPT state tree.

Referring to FIG. 1, which is a schematic diagram of organizing account state data of a blockchain into an MPT state tree.

An MPT tree is an improved Merkle tree variant, which combines advantages of Merkle tree and Trie dictionary tree (also called prefix tree).

There are usually three types of data nodes in the MPT tree, which are respectively leaf nodes, extension nodes and branch nodes.

A leaf node is a key-value pair expressed as [key, value], where the key is a special hexadecimal code.

An extension node is also a key-value pair [key, value], but the value is a hash value (hash pointer) of other nodes. In other words, other node can be linked through the hash pointer link.

For a branch node, since the key in the MPT tree is encoded into a special hexadecimal representation, with a final value, the branch node is a list of a length of 17, in which the first 16 elements correspond to the 16 possible hexadecimal characters of the key (one character corresponds to one nibble). If there is a [key, value] pair terminated at this branch node, the last element represents the value of value, that is, the branch node can be either a termination of a search path or an intermediate node of a path.

Assuming that the account state data that needs to be organized into an MTP state tree is shown in Table 1 below:

TABLE 1

| Account Address (Key) | | | | | | Account State (Value) |
|---|---|---|---|---|---|---|
| a | 7 | 1 | 1 | 3 | 5 | state1 |
| a | 7 | 7 | d | 3 | 3 | state2 |
| a | 7 | f | 9 | 3 | 6 | state3 |
| a | 7 | 7 | d | 3 | 9 | state4 |

In Table 1, the account address is a string of hexadecimal characters. The account state state is a structure composed of the fields such as Balance, Nonce, Code, and Storage.

Finally, the MPT state tree organized based on the account state data in Table 1 is shown in FIG. 1. As shown in FIG. 1, the MPT state tree formed by the account state data in Table 1 is composed of 4 leaf nodes, 2 branch nodes, and 2 extension nodes.

In FIG. 1, the prefix field is a prefix field shared by the extension node and the leaf node. In actual application, field values of the prefix filed can be used to represent the type of the node.

The value of the prefix field being 0 indicates an extension node containing an even number of nibbles. As mentioned earlier, a nibble represents half of a byte, consisting of 4-bit binary, and a nibble can correspond to a character that constitutes an account address.

The value of the prefix field being 1 indicates an extension node containing an odd number of nibble(s).

The value of the prefix field being 2 indicates a leaf node containing an even number of nibbles.

The value of the prefix field being 3 indicates a leaf node containing an odd number of nibble(s).

For a branch node, since it is a prefix node of single nibbles in parallel, the branch node does not have the prefix field described above.

A Shared nibble field in an extension node corresponds to the key value of the key-value pair contained in the extension node, represents a common character prefix between account addresses. For example, all account addresses in the table above have a common character prefix a7. The Next Node field is filled with a hash value (a hash pointer) of the next node.

The hexadecimal character 0~f field in the branch node corresponds to the key value of the key-value pair contained in the branch node. If the branch node is an intermediate node on the search path of the account address on the MPT tree, the Value field of the branch node can be null. The 0~f field is used to fill the hash value of the next node.

The key-end in the leaf node corresponds to the key value of the key-value pair contained in the leaf node, and represents the last few characters of the account address. The key value of each node on the search path from the root node to the leaf node constitutes a complete account address. The Value field of the leaf node is filled with account state data corresponding to the account address. For example, the structure formed by the above fields such as Balance, Nonce, Code, and storage can be encoded and then filled into the Value field of the leaf node.

Further, the nodes on the MPT state tree shown in FIG. 1 are finally stored in the database in the form of key-value pairs Key-Value.

Here, when a node on the MPT state tree is stored in the database, the key in the key-value pair of the node on the MPT state tree can be the hash value of the data content contained in the node; and the Value in the key-value pair of the node on the MPT state tree is the data content contained in node.

That is, when a node on the MPT state tree is stored in the database, a hash value of the data content contained in the node can be calculated (that is, a hash value is calculated with respect to the entire node), and the calculated hash value can be used as a key. The data content contained in node is used as value to generate a key-value pair Key-Value; then, the generated key-value pair Key-Value is stored in the database.

Since the key of a node on the MPT state tree is the hash value of the data content of the node and the data content of the node is stored as the value, when a node on the MPT state tree is searched for, the hash value of the data content contained in the node can generally be used as a key for content addressing. When content addressing is applied, nodes with "duplicate content" can usually be "reused" to save storage space for storing data.

Figure 2A:
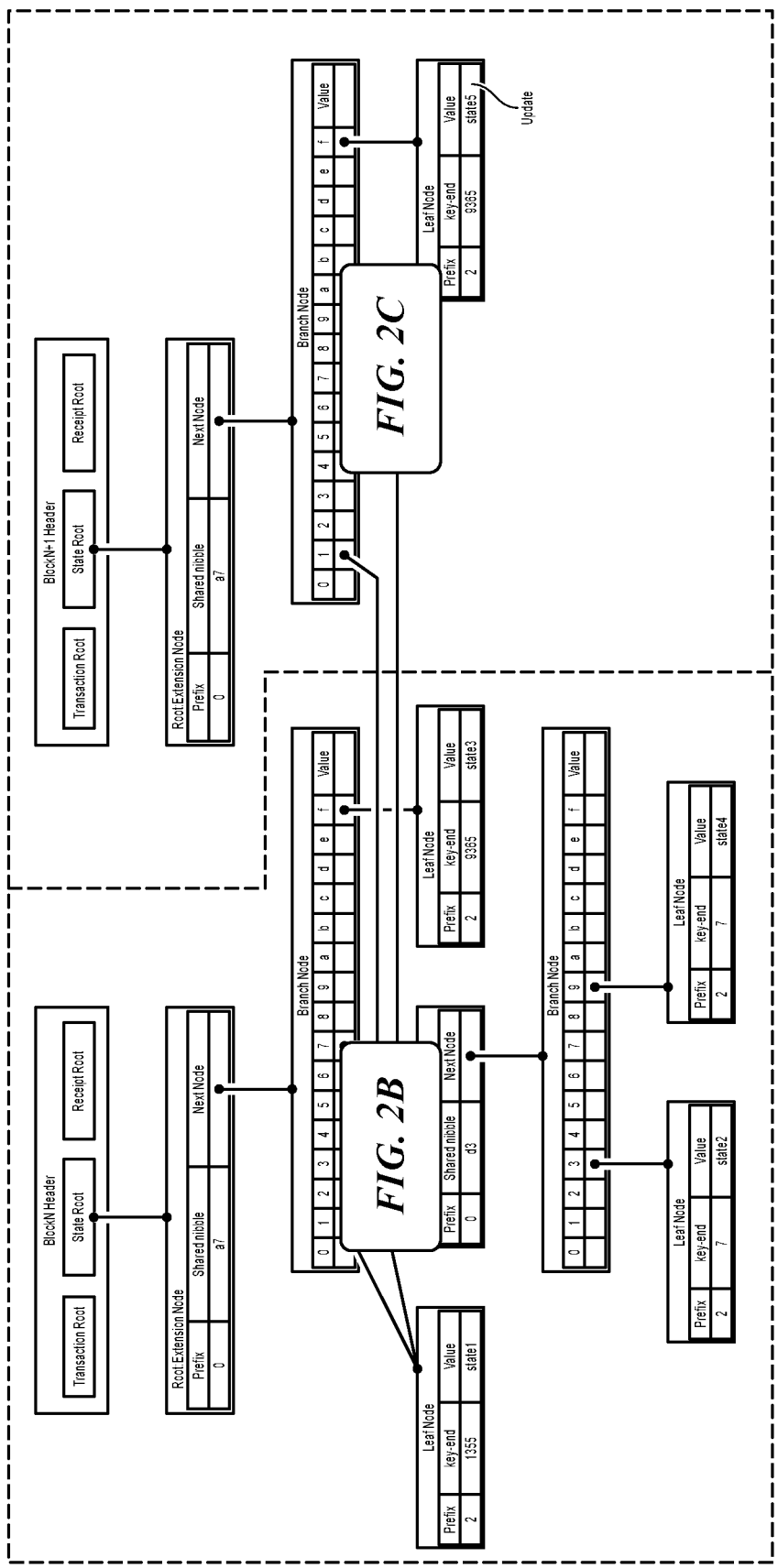
FIGS. 2A-2C represent a schematic diagram illustrating reusing nodes on an MPT state tree, according to an example embodiment.
Figure 2B:
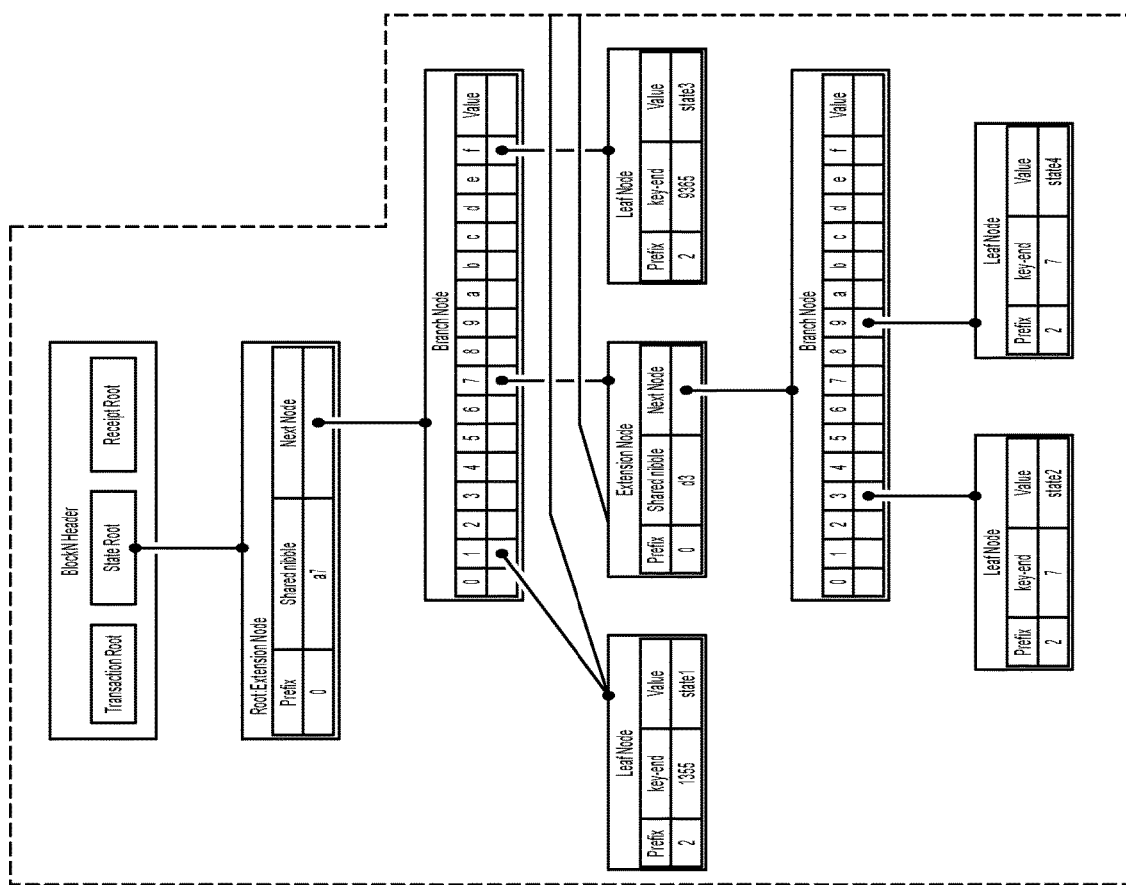
Figure 2C:
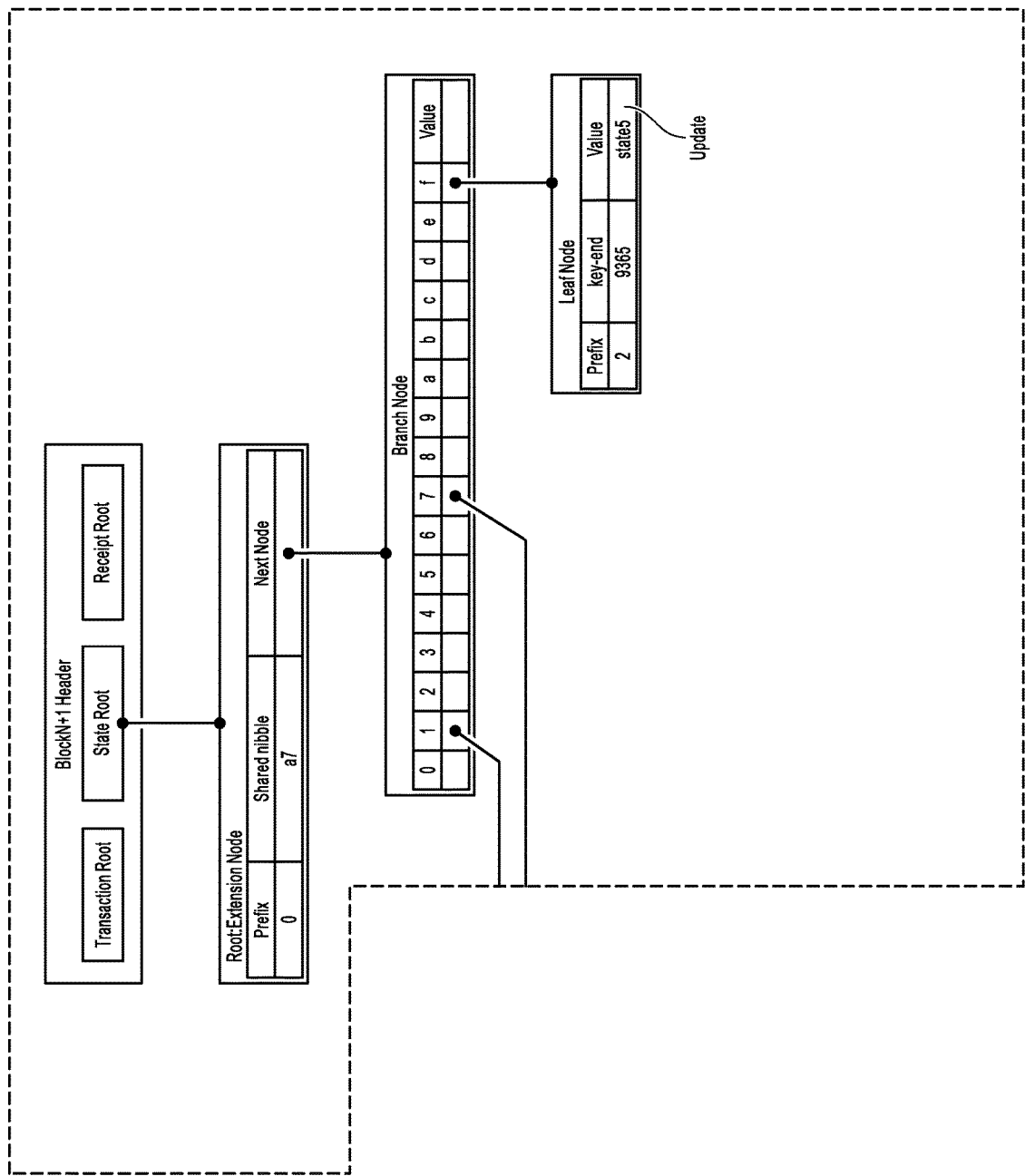

As shown in FIGS. 2A-2C, FIGS. 2A-2C represent a schematic diagram of reusing nodes on an MPT state tree shown in the present specification.

In actual application, whenever a latest block is generated by the blockchain, after the transactions in the latest block are executed, the account states of the accounts associated with these executed transactions in the blockchain usually changes with it.

For example, after a "transfer transaction" in the block is completed, the balance of the sending account and the receiving account related to the "transfer transaction" (that is, the value of the Balance field of these accounts) usually change with it.

After the transactions in the latest block generated by the blockchain are executed, since the account states in the current blockchain have changed, the node device needs to build an MPT tree based on the current account state data of all accounts in the blockchain, to maintain the latest states of all accounts in the blockchain.

That is, whenever a latest block is generated in the blockchain and the transactions in the latest block are completed, the account states in the blockchain changes, and the node device needs to rebuild an MPT tree based on the latest account state data of all accounts in the blockchain.

In other words, each block in the blockchain has a corresponding MPT state tree; the MPT state tree maintains the latest account states of all the accounts in the blockchain after the transactions in the block are completed.

It should be noted that, after execution of the transaction in the latest block generated by the blockchain is completed, it may only cause the account states of some accounts to change. Therefore, when updating the MPT state tree, it is not necessary to rebuild a complete MPT state tree based on the current state data of all accounts in the blockchain, but only need to update the nodes corresponding to the some accounts of which account states have changed based on the MPT state tree corresponding to the blocks before the latest block. For the nodes on the MPT state tree that correspond to the accounts of which account states have not changed, since no data updates have occurred on these nodes, the nodes on the MPT state tree corresponding to the blocks before the latest block can be readily reused.

As shown in FIGS. 2A-2C, assume that the account state data in Table 1 is the latest account states of all accounts on the blockchain after execution of the transaction in Block N is completed, and the MPT state tree organized based on the account state data in Table 1 is still as shown in FIG. 1.

Assuming that after execution of the transaction in Block N+1 is completed, the account state of the account address "a7f9365" in Table 1 is updated from "state3" to "state5". At this time, when the Block N+1 updates the MPT state tree, it is not necessary to rebuild an MPT state tree based on the current state data of all accounts in the blockchain after execution of the transactions in Block N+1 is completed.

Referring to FIGS. 2A-2C, in this case, the value in the leaf node with the key-end being "9365" on the MPT tree corresponding to Block N (that is, the MPT state tree shown in FIG. 1) can be updated from "state3" to "state5", and continue to update the hash pointers of all nodes on the path from the root node to the leaf node. That is, when a leaf node on the MPT state tree is updated, as the hash value of the entire leaf node is updated, the hash pointers of all nodes on the path from the root node to the leaf node are also updated accordingly. For example, still referring to FIGS. 2A-2C, in addition to updating the value of Value field in a leaf node with a "key-end" of "9365", it also needs to update the hash pointer pointing to the leaf node which is filled in the f field of the previous branch node of the leaf node. Further, it is possible to continue to trace back to the root node and continue to update the hash pointer pointing to the branch node which is filled in the "Next Node" field in the previous root node (Root Extension Node) of the branch node.

In addition to the nodes that have been updated above, other nodes that have not been updated can directly reuse the corresponding nodes on the MPT state tree of Block N;

Here, the MPT tree corresponding to Block N needs to be retained as historical data. Therefore, when the MPT state tree is updated by Block N+1, these updated nodes are not modified and updated directly on the original nodes on the MPT state tree corresponding to Block N, but these updated nodes are recreated on the MPT tree corresponding to Block N+1.

That is, on the MPT state tree corresponding to Block N+1, only a small number of nodes that need to be updated are actually recreated. For other nodes that have not been updated, the corresponding nodes on the MPT state tree corresponding to Block N can be directly reused.

For example, as shown in FIGS. 2A-2C, for the MPT state tree corresponding to Block N+1, actually only a few nodes that have been updated need to be recreated. For example, in FIGS. 2A-2C, only an extension node as a root node, a branch node, and a leaf node need to be recreated; for the nodes that have not been updated, to complete the "reusing" of the nodes, add hash pointers pointing to the corresponding nodes on the MPT state tree corresponding to Block N to these recreated nodes on the MPT state tree. The nodes before the update on the MPT state tree corresponding to Block N will be saved as historical account state data. For example, the leaf node with "key-end" of "9365" and Value of "state3" shown in FIGS. 2A-2C will be retained as historical data. In the above example, content of a few nodes on the MPT state tree of Block N+1 are updated, so that most nodes of the previous block Block N can be "reused" as an example. In actual application, the MPT state tree of Block N+1 can also be added with a node compared to that of the previous block Block N.

In this case, although the newly added node cannot be "reused" directly from the MPT tree of the previous block Block N, it can be "reused" from the MPT state tree of an earlier block.

For example, although the newly added node on the MPT state tree of Block N+1 is not on the MPT state tree of Block N, the node may appear on the MPT state tree of an earlier block; for example, on the MPT state tree of Block N−1. Therefore, the newly added node on the MPT state tree of Block N+1 can directly reuse the corresponding node on the MPT state tree of Block N−1.

It can be seen that there are two types of "reusing" embodiments in an MPT state tree.

In one embodiment, if only a small number of nodes on the MPT state tree of a block have updated content, they can "reuse" most of the nodes of the previous block.

In another embodiment, if the MPT state tree of a block has newly added nodes compared to the MPT state tree of the previous block, the corresponding nodes on the MPT state tree of the earlier block can be "reused".

Through node reuse, the storage space of the database can be saved. However, due to the complex reusing relationship between the nodes on the MPT state trees of the blocks, that is, the nodes on the MPT state tree of each block can be reused by the next block, or by several consecutive blocks after the next block, such complex node reusing relationship can inevitably cause difficulties in hierarchical storage of the MPT state tree.

For example, when some nodes need to be used as historical data and migrated from the current level of data storage to the next level of data storage, these nodes may be reused by the next block; or even by several blocks after the next block; and it is impossible to accurately predict which nodes will reuse these nodes. Therefore, it will be impossible to accurately prune the nodes on the MPT state tree stored in the database. Here, the pruning refers to clearing the reusing relationship between the nodes on the MPT state trees of the blocks, removing the nodes that have recorded historical state data from the MPT state tree, and keeping the nodes that have recorded the latest state data. In this case, apparently the demand for hierarchical storage cannot be met.

Based on this, the present specification provides a hierarchical storage method for a state Merkle tree formed of account state data of a blockchain.

In embodiment, the account state data of the blockchain can still be organized into a state Merkle tree and stored in a database with a multi-level data storage structure. For example, the data structure of the MPT tree can still be used to organize blockchain account state data into an MPT state tree.

For the state Merkle tree stored in the database, a block number can be labeled for each node on the state Merkle tree, and the block number is specifically used to indicate the block number of the block where the node was located when the node had data update.

For example, in an embodiment, after the execution of the transaction in the latest block generated by the blockchain is completed, nodes having data updates on the state Merkle tree of the latest block can be determined based on the execution result of the transactions in the latest block. Nodes having data updates usually include nodes having the values of value updated and newly added nodes. After determining the nodes having data updates on the state Merkle tree of the latest block, these nodes having data updates can be labeled with the block number of the latest block, which indicates that the nodes have data updates in the block corresponding to the block number.

Further, when target data storage of any level in the database satisfies a data migration condition, for example, the storage capacity of target data storage has reaches a threshold, first, determine a block number interval corresponding to the data nodes in the target data storage that need to be migrated to the lower level data storage; and a migration threshold is determined based on the block number interval; wherein the migration threshold is a block number threshold larger than the block number interval.

For example, in one embodiment, if the block number interval is a right-opened interval, the right endpoint value of the block number interval is determined as the migration threshold. For example, assuming that the block number interval is [a, b), then b is determined as the migration threshold; if the block number interval is a right-closed interval, the sum of the increase of the right endpoint value of the block number interval and a step size of the block number of the blockchain is determined as the migration threshold. For example, assuming that the block number interval is [a, b], the step size of the increase of the block number of the blockchain is 1 (that is, the block number in the blockchain is densely incremented by 1), then b+1 is determined as the migration threshold.

After the migration threshold is determined, the state Merkle tree of the target block corresponding to the migration threshold can be traversed, to search for target nodes labeled with block numbers respectively smaller than the migration threshold, and the block numbers of the target nodes searched out are respectively modified to the migration threshold.

Further, after the block numbers of the target nodes searched out are forcibly modified to the migration threshold, the state Merkle tree of the block corresponding to each block number in the block number interval can be continued to be traversed, to search for nodes labeled with block numbers respectively smaller than the migration threshold, and the nodes searched out are migrated from the target data storage to the lower level data storage of the target data storage. After the writing is successfully completed, the nodes are cleared from the target data storage.

Through the above technical solutions, precise pruning of nodes on the state Merkle tree stored in the database can be achieved. Nodes that record historical state data are removed from the state Merkle tree, and migrated to the lower level of data storage. Nodes that record the latest state data can be remained to be stored in the current-level of data storage. Thereby it can achieve the hierarchical storage of the state Merkle tree stored in the database.

Figure 3:
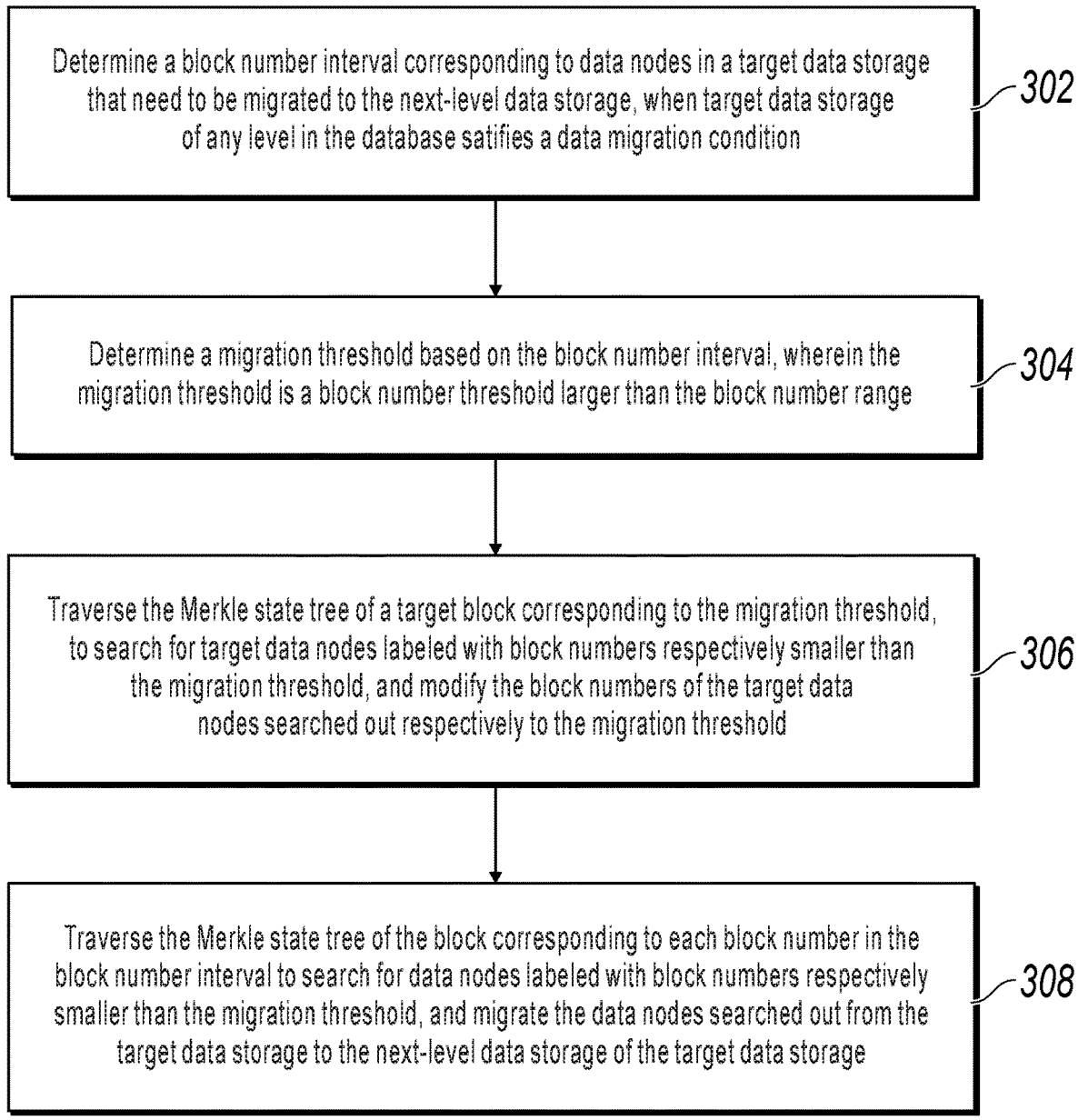
FIG. 3 is a flowchart illustrating a blockchain-based hierarchical storage method, according to an example embodiment.

Referring to FIG. 3, which is a flowchart of a blockchain-based hierarchical storage method according to an example embodiment. The method is applied to a blockchain node device; wherein account state data of the blockchain is organized into a state Merkle tree and stored in a database; the database includes multi-level data storage; each of the data nodes on the state Merkle tree is labeled with a block number indicating a block where the data node was located when the data node had data update; and the method includes the following steps.

Step 302, a block number interval corresponding to data nodes in a target data storage that need to be migrated to the lower level data storage is determined, when target data storage of any level in the database satisfies a data migration condition.

Step 304, a migration threshold is determined based on the block number interval, wherein the migration threshold is a block number threshold larger than the block number interval.

Step 306, the state Merkle tree of the target block corresponding to the migration threshold is traversed, to search for target data nodes labeled with block numbers respectively smaller than the migration threshold, and the block numbers of the target data nodes searched out are respectively modified to the migration threshold.

Step 308, the state Merkle tree of the block corresponding to each block number in the block number interval is traversed to search for data nodes labeled with block numbers respectively smaller than the migration threshold, and the data nodes searched out are migrated from the target data storage to the lower level data storage of the target data storage.

The database can be a Key-Value type database that has a multi-level data storage structure for storage. For example, in one illustrated embodiment, the database can be a LevelDB database; or a database based on a LevelDB architecture. For example, a Rocksdb database is a typical database based on the LevelDB database architecture.

The account state data in the blockchain can be organized into the data structure of the state Merkle tree and stored in the database. For example, the state Merkle tree can be an MPT tree, and a data structure of an MPT tree can be used to organize the account state data of the blockchain into an MPT state tree.

The following uses the data structure of the MPT tree to organize the account state data in the blockchain into an MPT state tree as an example to describe the technical solution of the present specification in detail.

It should be emphasized that using the data structure of the MPT tree to organize account state data in the blockchain is only an example embodiment.

In actual application, for blockchain projects based on the Ethereum architecture, in addition to the improved Merkle tree such as the MPT tree, it is also possible to use other forms of Merkle tree variants similar to the MPT tree and incorporating the tree structure of the Trie dictionary tree, which will not be listed one by one in the present specification.

In the present specification, a user client accessing the blockchain can package data into a standard transaction format supported by the blockchain, and then post it to the blockchain. The node devices in the blockchain can cooperate with other node devices to perform consensus on these transactions posted by the user client to the blockchain based on the installed consensus algorithm, to generate the latest blocks for the blockchain.

The consensus algorithms supported in the blockchain are generally classified into consensus algorithms in which node devices have to compete for the accounting right of each round of accounting cycle, and consensus algorithms in which accounting nodes are elected previously for each round of accounting cycle (no need to compete for the accounting right).

For example, the former is represented by consensus algorithms such as Proof of Work (POW), Proof of Stake (POS), and Delegated Proof of Stake (DPOS); and the latter is represented by Practical Byzantine Fault Tolerance (PBFT) and other consensus algorithms.

For a blockchain network applying consensus algorithms such as Proof of Work (POW), Proof of Stake (POS), and Delegated Proof of Stake (DPOS) and other consensus algorithms, node devices that compete for the accounting right can execute a transaction upon receiving the transaction. One of the node devices competing for the accounting right may win in the current round of contention for the accounting right and become the accounting node. The accounting node can package the received transaction with other transactions to generate the latest block, and send the generated latest block to other node devices for consensus.

In the blockchain network applying the consensus algorithm such as Practical Byzantine Fault Tolerance (PBFT), the node device having the accounting right has been agreed on before the current round of accounting. Therefore, upon receiving a transaction, a node device, if the node device is not the accounting node of the current round, can send the transaction to the accounting node.

The accounting node of the current round can execute the transaction during or before the transaction is packaged with other transactions to generate the latest block. After the accounting node packages the transaction and other transactions to generate the latest block, the accounting node can send the generated latest block or the block header of the latest block to other node devices for consensus.

As mentioned above, no matter which consensus algorithm is adopted by the blockchain, the accounting node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the accounting process of the blockchain.

In the present specification, after the node devices in the blockchain perform the transactions packaged in the latest block generated by consensus, the account state related to these executed transactions in the blockchain usually change accordingly. Therefore, after the node devices perform the packaged transactions in the latest block, the node devices can organize a data structure of an MPT state tree based on the latest account state data of all accounts in the blockchain.

Here, when organizing an MPT state tree based on the latest account state data of all accounts in the blockchain, the method of reusing nodes on the MPT tree corresponding to the block before the latest block as shown in FIGS. 2A-2C can still be used, it is omitted in this specification for simplicity.

When the node device organizes the MPT state tree based on the latest account state data of all accounts in the blockchain, the node device can store the data nodes on the MPT state tree in the form of key-value pairs Key-Value in a Key-Value database with a multi-level data storage structure.

For example, in actual application, the data nodes on the MPT state trees corresponding to some latest blocks can be stored by default in the highest level L0 data storage in the database. The data nodes on the MPT state trees corresponding to some second latest blocks can be stored in the second highest level L1 data storage in the database; and so on. Here, the quantity of blocks corresponding to the MPT state tree stored in each level of data storage is not specifically limited in the present specification; for example, the highest level L0 of data storage can be specified to store the MPT state trees of N latest blocks, and the second highest level L1 of data storage can be specified to store the MPT state tree of the N second latest blocks; and so on.

In the present specification, a data node on the constructed MPT state tree can be labeled with a block number; and the block number labeled for the data node on the MPT state tree is used to indicate the block where the data node is located when the data node has data update.

For example, as shown in FIGS. 2A-2C, taking the node having data update on the MPT state tree corresponding to Block N+1 as an example, the block number labeled for these nodes is N+1, to indicate that these nodes have data updates after the execution of the transactions in Block N+1 are completed.

In embodiment, the node device can start a "block state update thread" locally to maintain and update the state of the node on the MPT state tree. After the execution of the transaction in the latest block generated by the blockchain is completed, the "block state update thread" can determine the nodes having data updates on the MPT state tree corresponding to the latest block; wherein the nodes having data updates usually include nodes having the values of value updated and newly added nodes.

For example, in embodiment, a node having data update on the MPT state tree corresponding to the latest block can be determined directly based on the execution result of the transactions in the latest block; or, a node having data update on the MPT state tree corresponding to the latest block can be determined by determining whether it is a reused node. For example, if it is a reused node, it indicates that the node is a node having no data update.

After determining the nodes having data updates on the MPT state tree corresponding to the latest block, the "block state update thread" can label the nodes having data updates with the block number of the latest block, to indicate that these nodes have data updates in the block corresponding to the block number.

In this way, whenever a latest block is generated by the blockchain, the "block state update thread" can promptly label the nodes having data updates on the MPT state tree corresponding to the latest block with the block number of the latest block, so that by traversing each node on the MPT state tree stored in the database, from the block number labeled for the node, the block where the node was located when the node had data update can be known. Since the value of value of each node on the MPT state tree (especially the leaf node on the MPT tree) after the latest data update can usually indicate the latest state of the node, by checking the block number of each node, in which block the latest state of each node is generated can be known. Therefore, this mechanism for labeling the block number for the node can provide a basis for the data migration of the data storage at all levels of the database.

It should be noted that the action of "block state update thread" labeling a block number for a node having data update on the MPT state tree can be performed in the process of constructing the MPT state tree, or can be performed in the process of storing the constructed MPT state tree in the database, it is not limited in this specification.

That is, the "block state update thread" can label a node having data update on the MPT state tree with a block number in the process of the node device constructing the MPT state tree, or label a node having data update on the MPT state tree with a block number in the process of storing the constructed MPT state tree in the database.

It should be noted that, in the present specification, the block number labeled for the node on the MPT state tree can be labeled in the block number field corresponding to the value of the node. In actual application, the block number field can be stored with the value of the node, or not to be stored with the value of the node, but in another physical location.

In an illustrated embodiment, a block number field can be set in the value of a node on the MPT state tree stored in the database; the block number labeled for the node on the MPT state tree can be added to the block number field set in the value of this node. The position of the block number field in the value of the node is not particularly limited in the present specification.

For example, in one example, a block number field can be added after the value (or before the value) of each node having data update on the MPT state tree, and then label node in the block number field with the block number.

In another illustrated embodiment, the block number field may not be stored with the value of the node on the MPT state tree, but may be set in a separate physical location. In this case, a block number field may be set in the database to point to the storage location of Value of the node on the MPT state tree. The block number labeled for the node on the MPT state tree can be added to the block number field at a separate physical location.

For example, taking the database being a Rocksdb database based on the LevelDB architecture as an example, the block number field can be set in a separate column family.

By storing the block number field at a separate physical location instead of storing with the Value of node, when the block number labeled for the node on the MPT state tree needs to be traversed, it is only necessary to read the block number from a separate physical location, instead of reading the entire value of the node, it can improve the search efficiency when traversing the block number labeled for the node on the MPT state tree.

In the present specification, the node device can also start a "migration thread" locally for migrating the node data on the MPT state tree stored in the data storage at each level in the database to the lower-level of data storage.

The "migration thread" can execute a scheduled task, and can periodically determine whether the data storage of each level in the database satisfies a reserved data migration condition.

The data migration condition of the data storage of each level in the database can be set based on actual data migration requirements, which will not be particularly limited in the present specification.

For example, in actual application, the data migration condition of the data storage at each level of the database can be that a storage capacity of the data storage at each level reaches a threshold; or it can also be that a number of blocks corresponding to the data stored in the data storage at each level reaches a threshold.

When the "migration thread" determines that the target data storage at any level in the database satisfies the data migration condition, the "migration thread" can perform data migration processing on the target data storage, and migrate part of the MPT state trees of the blocks stored in the target data storage to the lower level data storage as historical data.

In embodiment, when the target data storage satisfies the data migration condition, the "migration thread" can determine the block number interval corresponding to the node in the target data storage that needs to be migrated to the lower level data storage.

The block number interval corresponding to the node in the target data storage that needs to be migrated to the lower level data storage can be determined based on the block number of the next block after the previous data migration, and the maximum number of blocks that can be migrated from the target data storage at one time. For example, assuming that the next block after the previous data migration is Block N, and the number of blocks that can be migrated from the target data storage at one time is 30, the block number interval can be [N, N+29]; or [N, N+30).

When the "migration thread" determines the block number interval corresponding to the node in the target data storage that needs to be migrated to the lower level data storage, the "migration thread" can determine the migration threshold for this data migration based on the block number interval; where the migration threshold can be a value larger than the block number threshold of the block number interval.

It should be noted that, in actual application, the block number interval can be right-open or right-closed; and when the migration threshold is determined based on the block number interval, the migration threshold can have a certain difference whether the block number interval is right-opened or right-closed.

In an illustrated embodiment, if the block number interval is a right-opened interval, when determining the migration threshold based on the block number interval, the right endpoint value of the block number interval can be determined as the migration threshold.

For example, assuming that the block number interval is [a, b), the migration threshold determined based on the block number interval is the right endpoint value b of the block number interval.

In another illustrated embodiment, if the block number interval is a right-closed interval, when determining the migration threshold based on the block number interval, the sum of the right endpoint value of the block number interval and a step size of the increase of the block number of the blockchain is determined as the migration threshold.

For example, assuming that the block number interval is [a, b], and the block number step size of the increase of the blockchain is 1, then the migration threshold determined based on the block number interval is the right endpoint value of the block number interval b+1.

Wherein, the step size of the blockchain is usually incremented by 1, that is, the block number of the blockchain is densely incremented by 1 as a step; for example, the block number is incremented as 1, 2, 3, 4 . . . sequentially.

In actual application, the step size of the increase of the block number of the blockchain can also be an integer larger than 1. For example, the block number can also be incremented as 1, 3, 5, 7, . . . sequentially, which is not particularly limited in the present specification.

Further, after the "migration thread" determines a migration threshold for the current data migration based on the block number interval, the "migration thread" migrates the MPT state trees of the blocks corresponding to the block number interval stored in the target data storage to the lower level data storage as historical data.

Specifically, the "migration thread" can first traverse the MPT state tree of the target block corresponding to the migration threshold, to search for target data nodes in the MPT state tree which are labeled with block numbers respectively smaller than the migration threshold, and the block numbers of the target nodes searched out are respectively modified to the migration threshold.

For example, assuming that the block number interval is [a, b), and the migration threshold is the right endpoint value b of the block number interval, then the "migration thread" can traverse the MPT state tree of block b to search for data nodes on the MPT state tree which are labeled with block numbers respectively smaller than the migration threshold, and then modify the block numbers labeled for the data nodes searched out respectively to b.

Further, after the "migration thread" traverses the MPT state tree of the target block corresponding to the migration threshold, all the target data nodes in the MPT state tree which are labeled with block numbers respectively smaller than the migration threshold are respectively modified to the migration threshold, the "migration thread" can traverse the MPT state trees of the blocks corresponding to the block numbers in the block number interval, and search for data nodes on the MPT state trees of these blocks which are labeled with block numbers respectively smaller than the migration threshold. At this time, the data nodes that are searched out in the MPT state trees of these blocks and which are labeled with block numbers respectively smaller than the migration threshold can be used as historical data to be migrated to the lower level data storage of the target data storage. The "migration thread" can migrate these data nodes searched out to the lower level data storage of the target data storage.

For example, in embodiment, the "migration thread" can copy the data nodes searched out, store the copied data to the lower level data storage, and after successfully store the copied data nodes to the lower level data storage, these data nodes are cleared from the target data storage.

In this way, since on the MPT state trees of the blocks corresponding to the block numbers in the block number interval, the block numbers labeled for the nodes which are smaller than the migration threshold have been modified to the migration threshold, after the data migration is completed in the above manner, the nodes labeled with block numbers which have been modified to the migration threshold will continue to be stored and retained in this level of data storage. This is equivalent pruning the nodes on the MPT state tree stored in the database, removing the nodes that recorded historical state data from the MPT state tree, migrating them to the lower level of data storage, and keeping storing and retaining nodes recording the latest state data in the current level of data storage. Thereby, it can achieve the hierarchical storage for the MPT state tree stored in the database.

It should be noted that the processing actions corresponding to the "block state update thread" and the "migration thread" can be performed concurrently; that is, the "block state update thread" and the "migration thread" can perform parallel contention processing on the same node on the MPT state tree. Therefore, in actual application, in order to avoid the "block state update thread" and the "migration thread" performing concurrent contention processing on the same node to cause potential processing error, technical means can be used to ensure that at any one time, only one thread can access the same node on the MPT state tree.

Here, at any time, the specific technical means used to ensure that only one thread can access the same node on the MPT state tree is not specifically limited in the present specification. For example, in embodiment, a mutex technology, a single-thread technology can be used, which will not be described in detail in the present specification.

Corresponding to the above method embodiment, the present application also provides an embodiment of an apparatus.

Corresponding to the above method embodiment, the present specification also provides an embodiment of a blockchain-based hierarchical storage apparatus.

The embodiment of the blockchain-based hierarchical storage apparatus of the present specification can be applied to an electronic device. The apparatus embodiment can be implemented by software, or by hardware, or a combination of software and hardware. Taking software embodiment as an example, as an apparatus in a logical sense, it is formed by reading the corresponding computer program instructions in a non-volatile memory into a memory through a processor of an electronic device where it is located.

Figure 4:
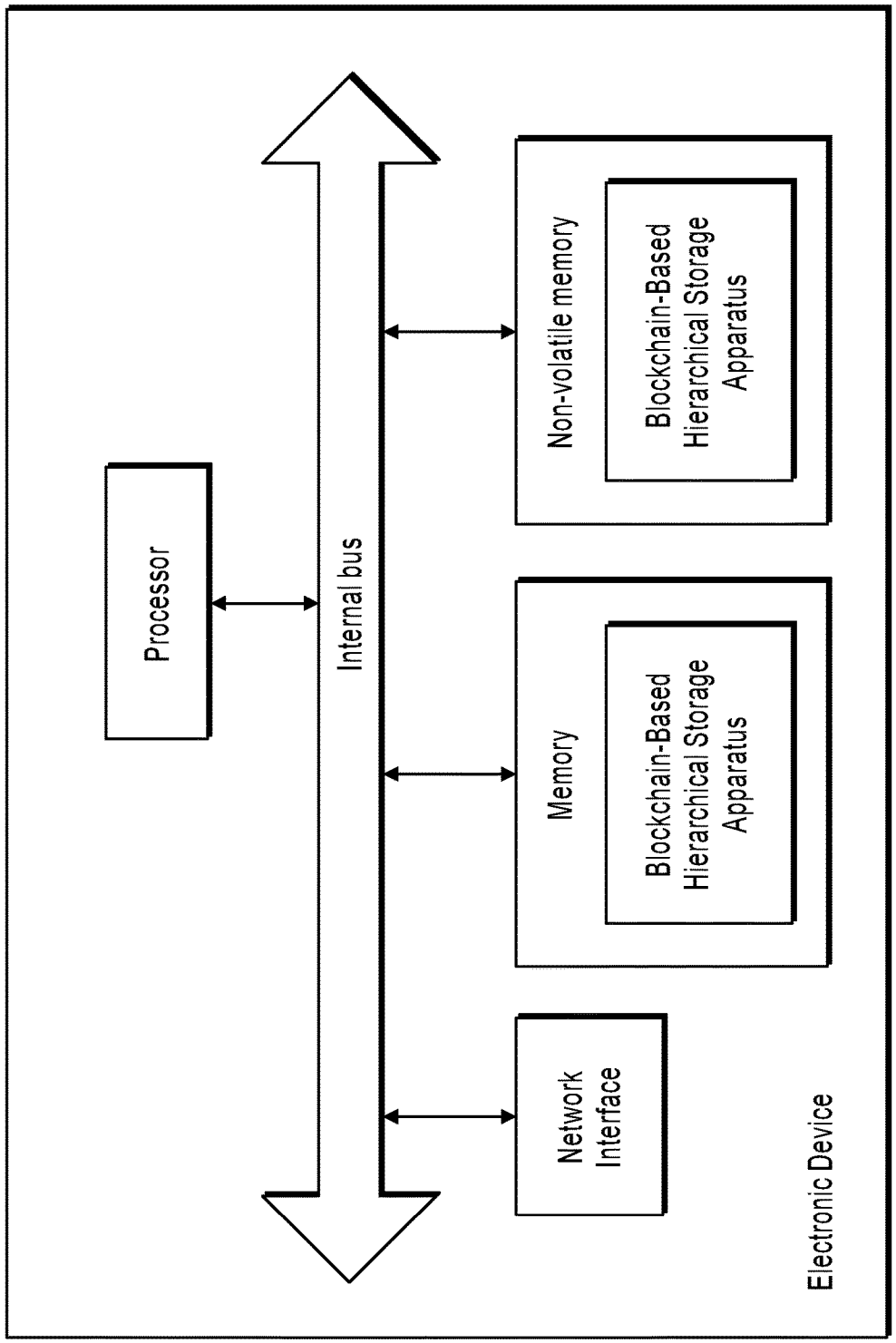
FIG. 4 is a schematic structural diagram of an electronic device, according to an example embodiment.

In terms of hardware, as shown in FIG. 4, which is a hardware structure diagram of an electronic device where the blockchain-based hierarchical storage apparatus of the present specification is located, in addition to the processor, the memory, the network interface, and the non-volatile memory shown in FIG. 4, the electronic device in which the apparatus is located in the embodiment can generally include other hardware based on the actual function of the electronic device, details are omitted here for simplicity.

Figure 5:
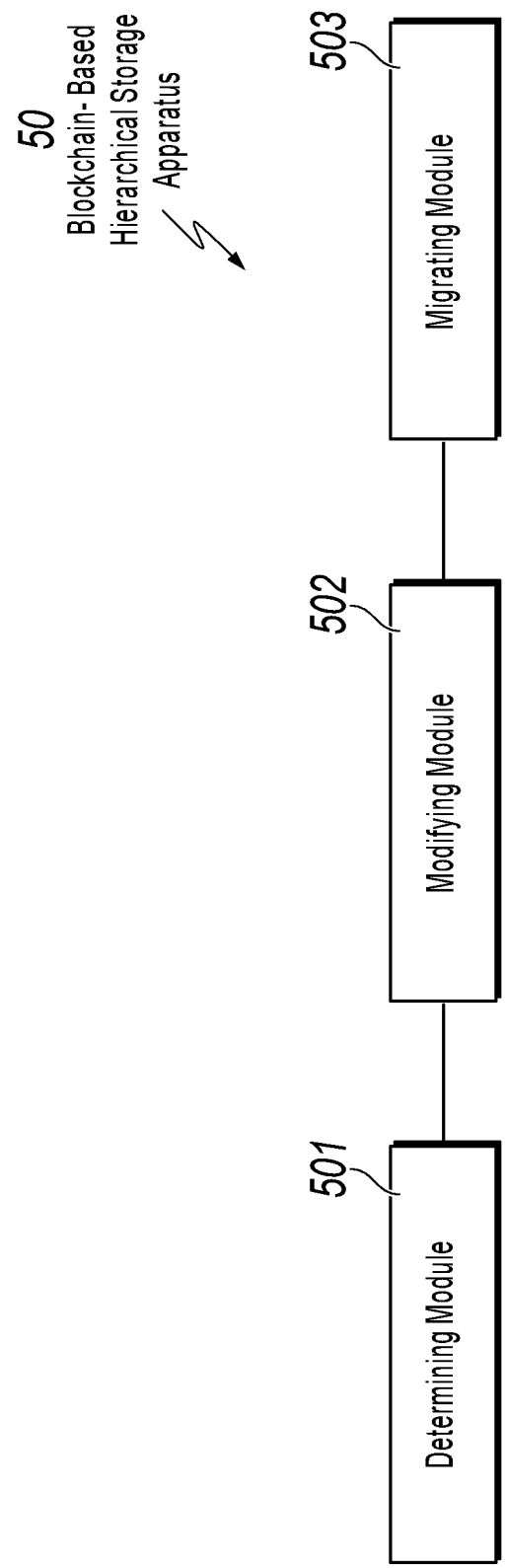
FIG. 5 is a block diagram of a blockchain-based hierarchical storage apparatus, according to an example embodiment.

FIG. 5 is a block diagram of a blockchain-based hierarchical storage apparatus, according to an example embodiment of the present specification.

Referring to FIG. 5, the blockchain-based hierarchical storage apparatus 50 can be applied to an electronic device as shown in FIG. 4; wherein account state data of the blockchain is organized into a state Merkle tree and stored in a database; the database includes multi-level data storage; each of the data nodes on the state Merkle tree is labeled with a block number indicating a block where the data node was located when the data node had data update; and the apparatus 50 includes: a determining module 501, configured to: when target data storage of any level in the database satisfies a data migration condition, determine a block number interval corresponding to data nodes in the target data storage that need to be migrated to the lower level data storage; determine a migration threshold based on the block number interval, wherein the migration threshold is a block number threshold larger than the block number interval; a modifying module 502, configured to traverse the state Merkle tree of a target block corresponding to the migration threshold, to search for target data nodes labeled with block numbers respectively smaller than the migration threshold, and modify the block numbers of the target data nodes searched out respectively to the migration threshold; and a migrating module 503, configured to traverse the state Merkle tree of the block corresponding to each block number in the block number interval to search for data nodes labeled with block numbers respectively smaller than the migration threshold, and migrate the data nodes searched out from the target data storage to the lower level data storage of the target data storage.

In the embodiment, the determining module 501 is configured to: when the block number interval is a right-opened interval, determine the right endpoint value of the block number interval as the migration threshold; and when the block number interval is a right-closed interval, determine the sum of the right endpoint value of the block number interval and a step size of the increase of the block number of the blockchain as the migration threshold.

In the embodiment, the database is a Key-Value database; the data nodes on the state Merkle tree are stored in the database in the form of Key-Value pairs; wherein the key of the Key-Value pair is a hash value of the data content contained in the data node; the value of the Key-Value pair is the data content contained in the data node.

In the embodiment, the apparatus 50 also includes: a labeling module 504 (not shown in FIG. 5), configured to determine data nodes having data update on the state Merkle tree of the latest block; and label the data nodes having data updates on the state Merkle tree of the latest block respectively with the block number of the latest block.

In the embodiment, the Value of the data node on the state Merkle tree stored in the database includes a reserved block number field; and the block number labeled for the data node on the state Merkle tree is added in the block number field.

In the embodiment, a block number field pointing to a storage location of the Value of the data node on the state Merkle tree is reserved in the database; and the block number labeled for the data node on the state Merkle tree is added in the block number field.

In the embodiment, the state Merkle tree is a Merkle Patricia Tree state tree.

In the embodiment, the database is a LevelDB database; or a database based on the LevelDB architecture.

In the embodiment, the database is a Rocksdb database based on the LevelDB architecture.

In the embodiment, the read-write performance of the storage medium corresponding to the multi-level data storage has a difference in performance; and the read-write performance of the storage medium corresponding to the high-level data storage is higher than the read-write performance of the storage medium corresponding the low-level data storage.

The system, apparatus, module, or unit described in the previous embodiments can be implemented by a computer chip or entity, or a product with a certain function. A typical embodiment device is a computer, and the specific form of the computer can be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

In a typical configuration, a computer includes one or more processors (CPUs), input/output interfaces, network interfaces, and memories.

The memory can include a transitory memory, a random access memory (RAM), and/or a non-volatile memory in a computer-readable medium, such as a read-only memory (ROM) or a flash RAM. The memory is an example of a computer-readable medium.

The computer-readable medium includes persistent, non-persistent, removable, or non-removable medium, which can store information by any method or technology. Information can be computer-readable instructions, data structures, modules of a program, or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a read-only disc, a read-only memory (CD-ROM), a digital versatile disc (DVD) or other optical storage, a magnetic tape cartridge, magnetic disk storage, a quantum memory, graphene-based storage media, or other magnetic storage devices or any other non-transmission media can be used to store information that can be accessed by computing devices. As defined in this specification, computer-readable media does not include transitory computer-readable media (transitory media), such as modulated data signals and carrier waves.

It should also be noted that the terms "including", "comprising" or any other variation thereof are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including a . . . " do not exclude the existence of other identical elements in the process, method, product or device including the elements.

The specific embodiments of the present specification have been described above. Other embodiments are within the scope of the following claims. In some cases, the actions or steps recited in the claims can be performed in a different order than in the embodiments, and the desired result can still be achieved. In addition, the processes depicted in the figures do not necessarily require the particular order shown or sequential order to achieve the desired results. In some embodiments, multitasking and parallel processing are also possible or can be advantageous.

The terms used in the present specification are for the purpose of describing particular examples only, and are not intended to limit the present specification. Terms determined by "a", "the" and "said" in their singular forms in the present specification and the appended claims are also intended to include plurality, unless clearly indicated otherwise in the context. It should also be understood that the term "and/or" as used herein is and includes any and all possible combinations of one or more of the associated listed items.

It should be understood that, although terms "first," "second," "third," and the like can be used in the present specification to describe various information, such information should not be limited to these terms. These terms are only used to distinguish one category of information from another. For example, without departing from the scope of the present specification, first information can be referred as second information; and similarly, second information can also be referred as first information. Depending on the context, the word "if" as used here can be interpreted as "when" or "upon" or "in response to determining".

The above descriptions are merely preferred embodiments of one or more embodiments of the present specification, and are not intended to limit one or more embodiments of the present specification. Any modification, equivalent replacement, improvement and such within the spirit and principle of one or more embodiments of the present specification should be included in the protection scope of one or more embodiments of the present specification.

What is claimed:

1. A blockchain-based hierarchical data storage method comprising:
   determining, based on a blockchain stored in a database that includes multiple levels of storage, a block number interval that includes one or more block numbers associated with data nodes to be migrated to a lower level of storage in response to the data nodes meeting a data migration condition, wherein:
      each of the data nodes is included in a state Merkle tree and is associated with a block number of a block of the blockchain where the corresponding data node was last updated, and
      the lower level of storage corresponds to a storage media with lower storage cost;
   determining a migration threshold, wherein the migration threshold is a block number of a target block of the blockchain, and wherein determining the migration threshold comprises, if the block number interval is right-open, determining a right endpoint of the block number interval as the migration threshold, or, if the block number interval is right-closed, determining a sum of the right endpoint and a step size of the one or more block numbers in the block number interval as the migration threshold;
   traversing a state Merkle tree corresponding to the target block to identify first one or more target data nodes associated with block numbers smaller than the migration threshold;
   changing the block numbers associated with the first one or more target data nodes to the migration threshold;
   traversing one or more state Merkle trees corresponding to one or more blocks of the blockchain with the one or more block numbers in the block number interval to identify second one or more target data nodes associated with block numbers smaller than the migration threshold; and migrating the second one or more target data nodes to the lower level of storage.

2. The method according to claim 1, wherein the database is a key-value database, the data nodes included in the state Merkle state tree are stored as key-value pairs (KVPs), keys of the KVPs are hash values of corresponding values of the KVPs, and the values of the KVPs are data content of the corresponding data nodes.

3. The method according to claim 1, further comprising:
determining one or more data nodes updated in a state Merkle tree corresponding to the latest block of the blockchain; and
associating a block number of the latest block with the one or more data nodes.

4. The method according to claim 1, wherein each of the one or more block numbers is stored in a block number field that is preserved in a corresponding data node.

5. The method according to claim 4, wherein the block number field is preserved to identify a storage location of a value of the corresponding data node included in the state Merkle state tree.

6. The method according to claim 1, wherein the state Merkle tree has a tree structure constructed based on a Merkle tree and a prefix tree.

7. The method according to claim 1, wherein the state Merkle state is a Merkle Patricia Tree (MPT).

8. The method according to claim 1, wherein the database is a LevelDB database.

9. The method according to claim 1, wherein the database is a RocksDB database.

10. The method according to claim 1, wherein the storage media with lower storage cost has lower read-write performance.

11. A computer-implemented system, comprising one or more computers, and one or more computer memory devices interoperably coupled with the one or more computers and having tangible, non-transitory, machine-readable media storing one or more instructions that, when executed by the one or more computers, perform operations comprising:
determining, based on a blockchain stored in a database that includes multiple levels of storage, a block number interval that includes one or more block numbers associated with data nodes to be migrated to a lower level of storage in response to the data nodes meeting a data migration condition, wherein:
each of the data nodes is included in a state Merkle tree and is associated with a block number of a block of the blockchain where the corresponding data node was last updated, and
the lower level of storage corresponds to a storage media with lower storage cost;
determining a migration threshold, wherein the migration threshold is a block number of a target block of the blockchain, and wherein determining the migration threshold comprises, if the block number interval is right-open, determining a right endpoint of the block number interval as the migration threshold, or, if the block number interval is right-closed, determining a sum of the right endpoint and a step size of the one or more block numbers in the block number interval as the migration threshold;
traversing a state Merkle tree corresponding to the target block to identify first one or more target data nodes associated with block numbers smaller than the migration threshold;
changing the block numbers associated with the first one or more target data nodes to the migration threshold;

traversing one or more state Merkle trees corresponding to one or more blocks of the blockchain with the one or more block numbers in the block number interval to identify second one or more target data nodes associated with block numbers smaller than the migration threshold; and
migrating the second one or more target data nodes to the lower level of storage.

12. The computer-implemented system according to claim 11, wherein the database is a key-value database, the data nodes included in the state Merkle state tree are stored as key-value pairs (KVPs), keys of the KVPs are hash values of corresponding values of the KVPs, and the values of the KVPs are data content of the corresponding data nodes.

13. The computer-implemented system according to claim 11, further comprising:
determining one or more data nodes updated in a state Merkle tree corresponding to the latest block of the blockchain; and
associating a block number of the latest block with the one or more data nodes.

14. The computer-implemented system according to claim 11, wherein each of the one or more block numbers is stored in a block number field that is preserved in a corresponding data node.

15. The computer-implemented system according to claim 14, wherein the block number field is preserved to identify a storage location of a value of the corresponding data node included in the state Merkle state tree.

16. The computer-implemented system according to claim 11, wherein the state Merkle tree has a tree structure constructed based on a Merkle tree and a prefix tree.

17. The computer-implemented system according to claim 11, wherein the state Merkle state is a Merkle Patricia Tree (MPT).

18. A non-transitory, computer-readable medium storing one or more instructions executable by a computer system to perform operations comprising:
determining, based on a blockchain stored in a database that includes multiple levels of storage, a block number interval that includes one or more block numbers associated with data nodes to be migrated to a lower level of storage in response to the data nodes meeting a data migration condition, wherein:
each of the data nodes is included in a state Merkle tree and is associated with a block number of a block of the blockchain where the corresponding data node was last updated, and
the lower level of storage corresponds to a storage media with lower storage cost;
determining a migration threshold, wherein the migration threshold is a block number of a target block of the blockchain, and wherein determining the migration threshold comprises, if the block number interval is right-open, determining a right endpoint of the block number interval as the migration threshold, or, if the block number interval is right-closed, determining a sum of the right endpoint and a step size of the one or more block numbers in the block number interval as the migration threshold;
traversing a state Merkle tree corresponding to the target block to identify first one or more target data nodes associated with block numbers smaller than the migration threshold;
changing the block numbers associated with the first one or more target data nodes to the migration threshold;

traversing one or more state Merkle trees corresponding to one or more blocks of the blockchain with the one or more block numbers in the block number interval to identify second one or more target data nodes associated with block numbers smaller than the migration threshold; and migrating the second one or more target data nodes to the lower level of storage.

* * * * *